United States Patent [19]

Bowman

[11] Patent Number: 5,400,846
[45] Date of Patent: Mar. 28, 1995

[54] TIRE CHAIN RAMP

[76] Inventor: Joseph M. Bowman, Rte. 2, Box 63, Stonewall, Okla. 74871

[21] Appl. No.: 190,834

[22] Filed: Feb. 2, 1994

[51] Int. Cl.6 .............................................. B60C 27/06
[52] U.S. Cl. .................................. 152/213 R; 14/69.5; 81/15.8; 254/88; 152/208; 152/231
[58] Field of Search .................... 152/208, 213 R, 231; 14/69.5; 81/15.8; 254/88

[56] References Cited

U.S. PATENT DOCUMENTS

| | | | |
|---|---|---|---|
| D. 283,317 | 4/1986 | Stewart | D12/157 |
| 3,913,651 | 10/1975 | Stonack | 152/213 R |
| 3,937,263 | 2/1976 | Hill et al. | 152/208 |
| 4,703,675 | 11/1987 | Dalaba | 81/15.8 |
| 5,033,146 | 7/1991 | Fogarty et al. | 14/69.5 |
| 5,056,206 | 10/1991 | Poulsen | 29/428 |
| 5,279,346 | 1/1994 | Summey | 152/213 R |

*Primary Examiner*—Ramon S. Britts
*Assistant Examiner*—Pamela O'Connor

[57] ABSTRACT

A tire chain ramp member in cooperation with a tire chain assembly is arranged to receive the cross link portion of the tire chain within a groove directed into the top wall of the ramp structure. The ramp top wall accommodates a tire member thereon to permit ease of mounting of the tire chain assembly relative to the vehicle tire, wherein subsequently the vehicle is driven from the ramp.

1 Claim, 3 Drawing Sheets

TIRE CHAIN RAMP

BACKGROUND OF THE INVENTION

1. Field of the Invention

The field of invention relates to tire ramp structure, and more particularly pertains to a new tire chain ramp wherein the same is arranged for the mounting of tire chains relative to an associated vehicle tire.

2. Description of the Prior Art

The prior art such as indicated in U.S. Pat. Nos. 3,913,651; 5,056,206; and 4,703,675 indicate the use of tire chains, wherein U.S. Pat. No. 5,033,146 indicates an integral vehicle ramp structure utilizing a honeycomb construction. A further ramp structure is illustrated in U.S. Pat. Des. No. 283,317.

The instant invention attempts to overcome deficiencies of the prior art by employing a tire ramp in cooperation with a tire chain to permit ease of mounting the tire chain relative to an associated vehicle tire and in this respect, the present invention substantially fulfills this need.

SUMMARY OF THE INVENTION

In view of the disadvantages inherent in the known types of tire chain structure now present in the prior art, the present invention provides a tire chain ramp wherein the same is arranged to permit ease of mounting of a tire chain assembly onto an associated vehicle. As such, the general purpose of the present invention, which will be described subsequently in greater detail, is to provide a new tire chain ramp apparatus and method which has many of the advantages of the prior art listed heretofore and many novel features that result in a tire chain ramp apparatus which is not anticipated, rendered obvious, suggested, or even implied by any of the prior art, either alone or in any combination thereof.

To attain this, the present invention provides a tire chain ramp member in cooperation with a tire chain assembly which is arranged to receive the cross link portion of the tire chain within a groove directed into the top wall of the ramp structure. The ramp top wall accommodates a tire member thereon to permit ease of mounting of the tire chain assembly relative to the vehicle tire, wherein subsequently the vehicle is driven from the ramp.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, intended to be limiting as to the scope of the invention in any way.

It is therefore an object of the present invention to provide a new tire chain ramp apparatus and method which has many of the advantages of the prior art listed heretofore and many novel features that result in a tire chain ramp apparatus which is not anticipated, rendered obvious, suggested, or even implied by any of the prior art, either alone or in any combination thereof.

It is another object of the present invention to provide a new tire chain ramp which may be easily and efficiently manufactured and marketed.

It is a further object of the present invention to provide a new tire chain ramp which is of a durable and reliable construction.

An even further object of the present invention is to provide a new tire chain ramp which is susceptible of a low cost of manufacture with regard to both materials and labor, and which accordingly is then susceptible of low prices of sale to the consuming public, thereby making such tire chain ramps economically available to the buying public.

Still yet another object of the present invention is to provide a new tire chain ramp which provides in the apparatuses and methods of the prior art some of the advantages thereof, while simultaneously overcoming some of the disadvantages normally associated therewith.

Yet still a further object of the present invention is to provide a new tire chain ramp wherein the ramp top wall accommodates a tire member thereon to permit ease of mounting of the tire chain assembly relative to the vehicle tire, wherein subsequently the vehicle is driven from the ramp.

An even further object of the present invention is to provide a new tire chain ramp in cooperation with a tire chain assembly wherein the ramp is arranged to receive the cross link portion of the tire chain within a groove directed into the top wall of the ramp structure.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
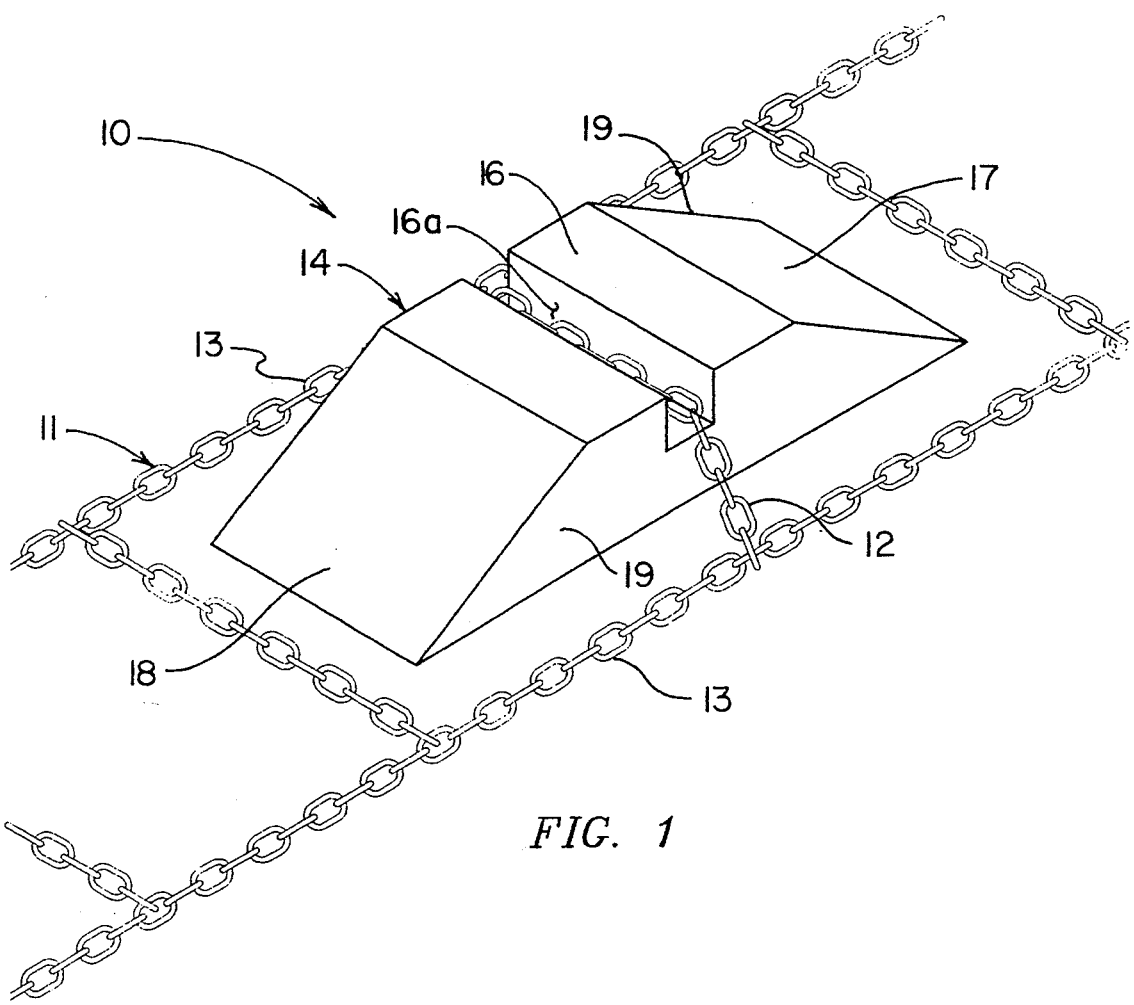
FIG. 1 is an isometric illustration of the invention.
Figure 2:
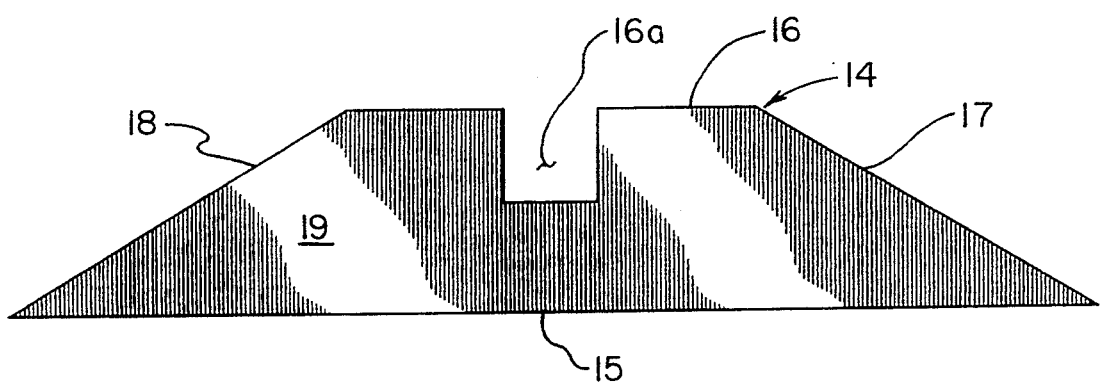
FIG. 2 is a side elevation view of the ramp structure.
Figure 3:
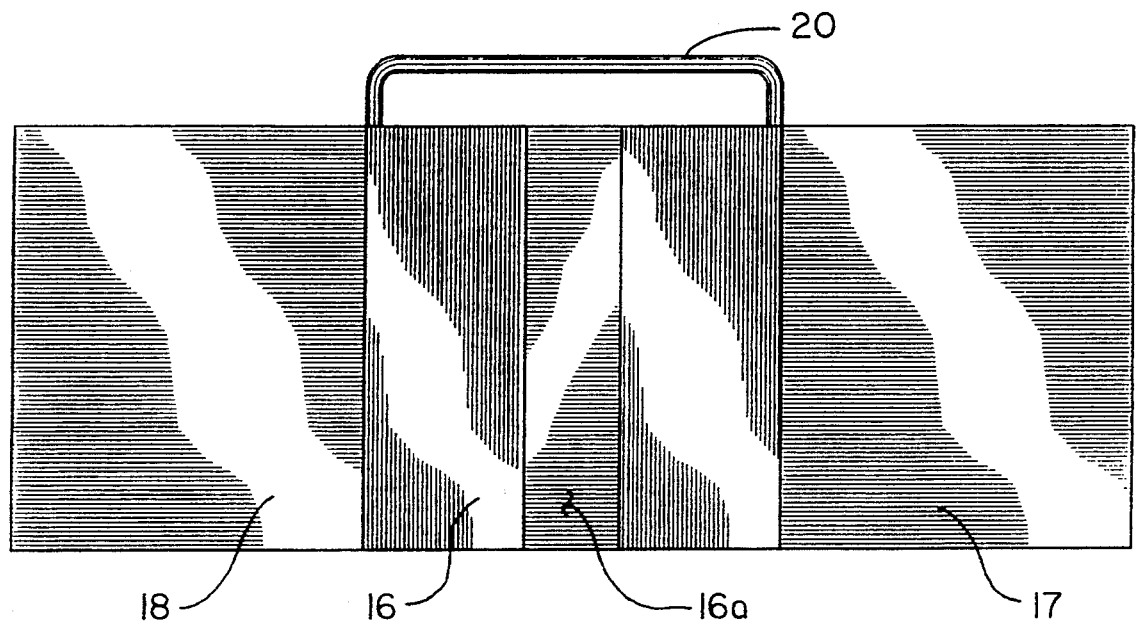
FIG. 3 is a top plan view of the ramp.

With reference now to the drawings, and in particular to FIGS. 1–6 thereof, a new tire chain ramp embodying the principles and concepts of the present invention and generally designated by the reference numeral 10 will be described.

Figure 4:
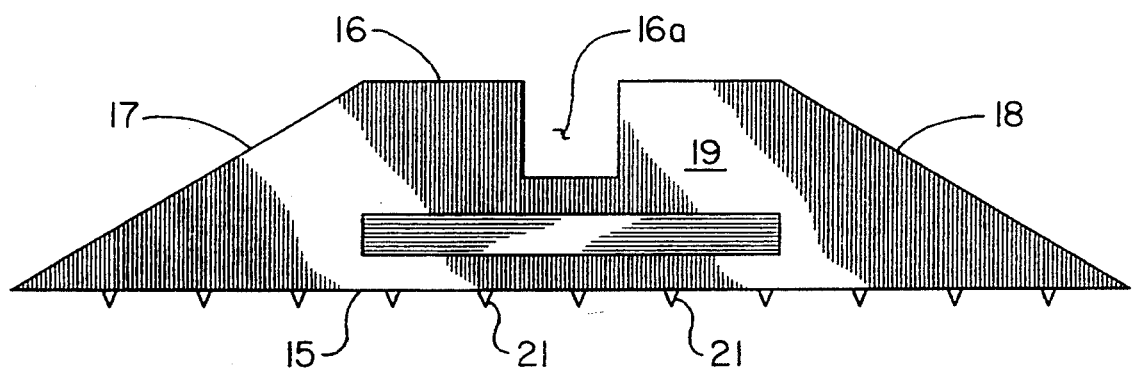
FIG. 4 is a further side elevation view of the ramp structure indicating the handle thereon.

More specifically, the tire chain ramp 10 of the instant invention comprises a tire chain assembly 11 having connecting chain portions 12 mounted and extending in fixed securement to chain side link members 13. A ramp member 14 is provided having a bottom wall 15 spaced from a top wall 16, with the top wall having a top wall groove 16a directed therein extending medially of the top wall and extending orthogonally between the side walls 19. A handle 20 is mounted to one of the side walls for ease of transport of the structure, such as indicated in FIG. 4. To facilitate the positioning of a vehicle tire upon the top wall 16, the ramp 14 further includes an inclined ramp rear wall 17 spaced from an inclined ramp front wall 18.

Figure 5:
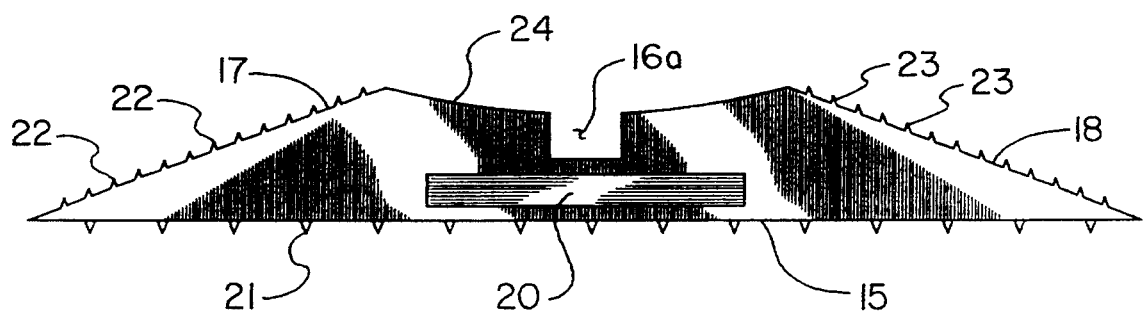
FIG. 5 is a side elevation view of the ramp structure including a convex top wall and cooperating friction ribs.
Figure 6:
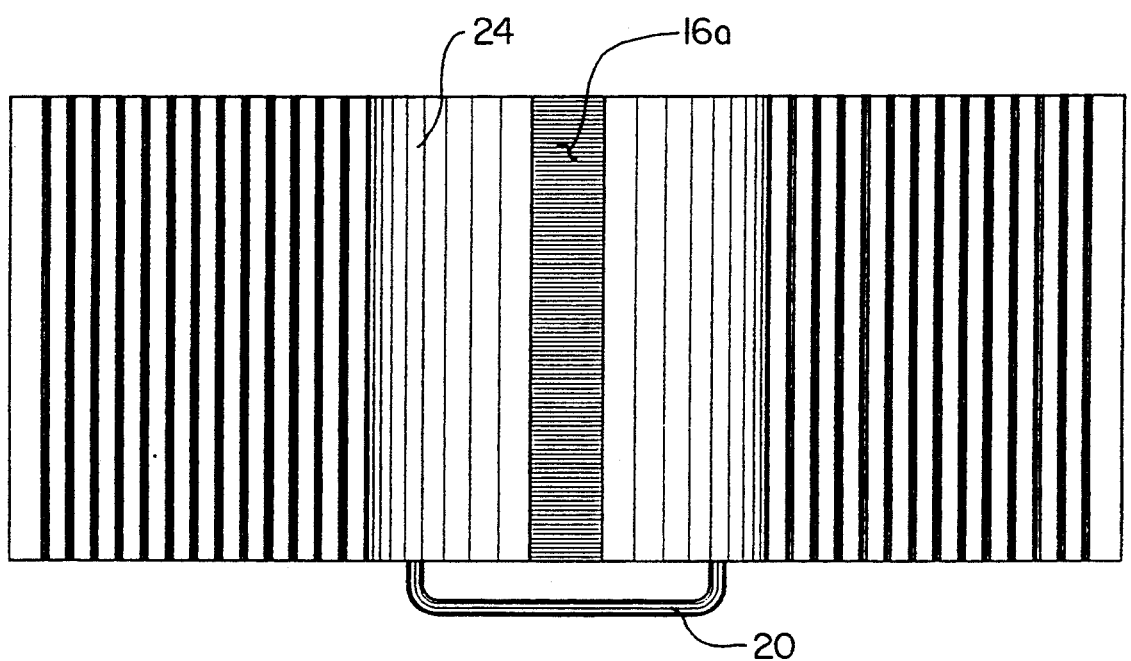
FIG. 6 is a top plan view of the ramp structure as indicated in FIG. 5.

The ramp structure such as indicated in FIG. 5 includes a modified top wall 24 of a concave construction for ease of centering of the tire and for precluding its accidental movement off of the top wall. The ramp illustrated in FIG. 5 also includes rear and front upwardly inclined ribs 22 and 23 extending orthogonally between the side walls 19 along the respective rear and front walls 17 and 18 to increased a frictional engagement between the vehicle tire and the walls 17, 18, thus easing access onto the top wall 24.

In this manner, it should be understood that a vehicle directed onto the ramp top wall 16 or 24 has access thereto along a respective front wall 17, wherein the connecting chain 12 is directed through the groove 16a prior to such access onto the top wall 24 by the vehicle. The chain assembly 11 may then be readily assembled onto the vehicle tire once the vehicle has mounted the ramp and the top wall 24 or 16 as noted. Subsequently, the vehicle is directed from the ramp structure 14 by driving the vehicle along the ramp rear wall 18.

In addition, the ramp 10 may be provided with spikes 21 which serve to engage an icy or frozen ground surface to preclude slippage of the ramp during placement of the vehicle tire upon the top wall 16 or 24. Such spike members 21 are illustrated in both FIGS. 4 and 5.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A tire chain ramp comprising:
   a tire chain assembly having spaced link side members and at least one connecting chain member connecting the side link members;
   a ramp member, the ramp member including a substantially flat and planar bottom wall spaced from a top wall and a front wall canted from the bottom wall to the top wall, and a rear wall canted from the top wall to the bottom wall, with spaced ramp side walls extending from the bottom wall to the top wall, the front wall including upwardly inclined transverse front wall ribs and the rear wall including upwardly inclined transverse rear wall ribs, the ramp member further having a groove extending into the top wall coextensively between the side walls, the top wall being of a concave configuration, with the groove medially intersecting the top wall, with the connecting chain received within the groove, the bottom wall including a plurality of spikes projecting therefrom, said spikes being spaced and parallel from one another so as to expose flat and planar portions of said bottom wall between adjacent ribs such that said planar portions of said bottom wall can reside flatly upon a ground surface with said spikes piercing into said ground surface; and,
   a handle member secured to one of the side walls for facilitating manual manipulation of the ramp.

* * * * *